United States Patent [19]

Sandrew

[11] Patent Number: 5,093,717
[45] Date of Patent: Mar. 3, 1992

[54] SYSTEM AND METHOD FOR DIGITALLY COLORING IMAGES

[75] Inventor: Barry B. Sandrew, Escondido, Calif.

[73] Assignee: American Film Technologies, Inc., Wayne, Pa.

[21] Appl. No.: 371,459

[22] Filed: Jun. 26, 1989

Related U.S. Application Data

[63] Continuation of Ser. No. 262,162, Oct. 19, 1988, abandoned, which is a continuation of Ser. No. 81,116, Aug. 3, 1987, abandoned.

[51] Int. Cl.$^5$ ............................................. H04N 1/46
[52] U.S. Cl. .................................... 358/81; 358/82
[58] Field of Search ................... 358/75, 78, 80, 81, 358/82

[56] References Cited

U.S. PATENT DOCUMENTS

| | | | |
|---|---|---|---|
| 3,772,465 | 11/1973 | Vlahos et al. | 358/81 |
| 3,784,736 | 1/1974 | Novak | 358/81 |
| 4,149,185 | 4/1979 | Weinger | 358/81 |
| 4,189,743 | 2/1980 | Schure et al. | 358/80 X |
| 4,189,744 | 2/1980 | Stern | 358/80 X |
| 4,258,385 | 3/1981 | Greenberg et al. | 358/80 |
| 4,329,710 | 5/1982 | Taylor | 358/81 |
| 4,606,625 | 8/1986 | Geshwind | 358/81 |
| 4,608,596 | 8/1986 | Williams et al. | 358/78 |
| 4,617,592 | 10/1986 | MacDonald | 358/80 |
| 4,694,329 | 9/1987 | Belmares-Sarabia et al. | 358/80 |
| 4,721,951 | 1/1988 | Holler | 358/80 |
| 4,755,870 | 7/1988 | Markle et al. | 358/81 |
| 4,847,689 | 7/1989 | Yamamoto et al. | 358/80 |
| 4,862,256 | 8/1989 | Markle et al. | 358/81 |

FOREIGN PATENT DOCUMENTS 3310949 9/1984 Fed. Rep. of Germany .

OTHER PUBLICATIONS

Mark A. Fischetti, "The Silver Screen Blossoms Into Color" *IEEE Spectrum*, Aug. 1987, pp. 50–55.

Wilson Markle, "The Development and Applicatoin of Colorization ®" *SMPTE Journal*, Jul. 1984, pp. 632–635.

*Primary Examiner*—James J. Groody
*Assistant Examiner*—Mark R. Powell
*Attorney, Agent, or Firm*—Ratner & Prestia

[57] ABSTRACT

A system and method for digitally coloring an image or a series of images such as a motion picture by digitally capturing the images, interactively defining masks corresponding to objects in the images having similar hues, and for each mask, defining a color transfer function for converting image gray-scale information to unique values of Hue, Luminance, and Saturation. The gray-scale values within each map are then processed through that map's color transfer function, and the resulting colors applied to the image and stored for later retrieval and display.

7 Claims, 17 Drawing Sheets

Gray-Scale

HLS Universe

FIG. 17
I
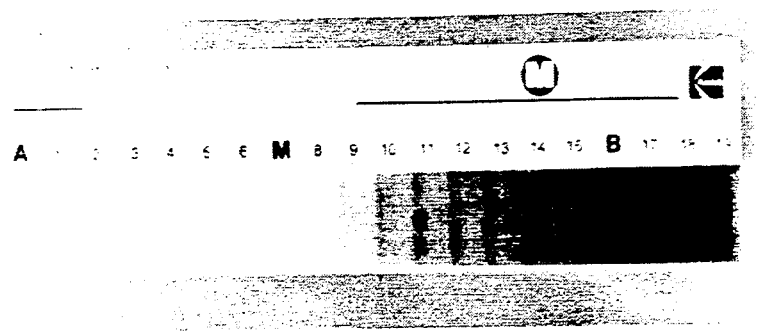
II
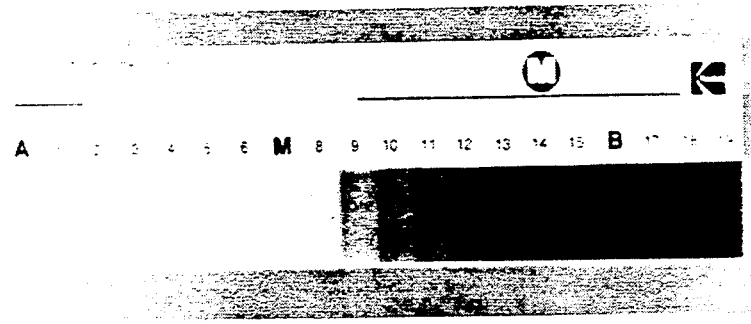
III
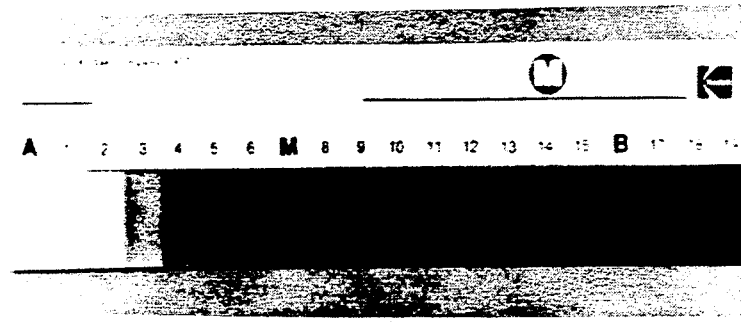

SYSTEM AND METHOD FOR DIGITALLY COLORING IMAGES

CROSS-REFERENCE TO RELATED APPLICATION

This is a continuation of Applicant's copending application Ser. No. 07/262,162 filed Oct. 19, 1988, abandoned. That application was a continuation of application Ser. No. 07/081,116, filed Aug. 3, 1987, which application is now abandoned.

FIELD OF THE INVENTION

The present invention pertains to a system and method for the color enhancement of monochrome or multi-color images by relation of digitized gray-scale information from the original image to unique values (triplets) of hue, luminance, and saturation derived from a color transfer function applied to the achromatic gray-scale information.

BACKGROUND OF THE INVENTION

Physics of Black and White Film

Conventional black and white film is comprised of silver-based light sensitive emulsion layers which undergoe chemical change in their light transmission properties upon exposure to light, and are subsequently developed. The silver emulsions used in films such as motion picture films are known to respond non-uniformly to differing colors of light, and to differing intensities and contrasts. Furthermore, the emulsions' response curves differ substantially from that of the human eye.

The degree to which a particular emulsion darkens in response to a given scene is primarily dependent on the overall intensity of light and the time of exposure. Commonly, intensity is controlled by an iris in the camera and is measured in F-stops. Time of exposure is controlled by a shutter and is measured in fractions of a second of exposure time.

A secondary determinant of the degree of darkness is the color of the light which is being used to expose the film. Since the silver emulsion of the film responds most strongly to only one particular wavelength, lights of equal intensity but differing color will produce differing darkness on the film, in direct relation to their closeness to the wavelength of maximum sensitivity of the film. For this reason, many photographers use colored filters (red or yellow, for instance) when using black and white film.

In photographing "real world" scenes, the amount of incident light, its source, its color, and the color of the objects comprising the scene are widely varied. For each unique combination of these factors, plus the additional filtering done by the photographer, the film produces a shade of gray. Because of the complex interactions of film response, colors, and shadings, however, these grays are not unique for each combination of these factors, and several combinations may produce the same shade of gray on film. For instance, a blue object photographed in bright light and a green one in dimmer light may appear identical in the black and white image. For this reason, early film directors used colors in sets and costumes which could be differentiated in the final film, often intentionally disregarding the actual appearance of the colors.

In strictly mathematical terms, the image produced on black and white film is one dimensional (brightness), while the original scene can be viewed as three dimensional (using the HLS model of color, where hue, luminance, and saturation are the dimensions). The chemical reaction of the film emulsion, and the camera mechanisms and filters essentially reduce the three dimensional information to one dimension by a complex mapping, and forever obliterate the original hue, luminance, and saturation information.

Note: It should be pointed out that luminance and brightness are not the same. Since brightness of the black and white image results from the complex interactions of the three elements of the HLS system, there is only a statistical correlation between brightness and luminance, but they are not identical.

Color Representation Systems

One theoretical model (Ostwald, W., *Colour Science*, Winsor & Winson, London, 1931) useful for analysis of color is the HLS model of hue, luminance, and saturation. This model uses a three dimensional space bounded by a pair of cones having a common base. The axis from apex to apex of the cones is the luminance axis, with the lower apex having a luminance of zero (all black) and the apex of the upper cone having a luminance of 1 (all white). Distance from the luminance axis (normal to the axis) determines saturation, with the axis representing zero saturation (no color) and the surface of the cone representing maximum saturation for a given luminance. Finally, angular displacement around the luminance axis represents hue, as with a conventional color wheel.

The solid space defined by the HLS model is pointed at its top and bottom to represent the fact that as colors become whiter or blacker, they lose hue. Saturation is a characteristic which depends chiefly on the narrowness or purity of the band of wavelengths comprising a color. At the exact center of the space is a medium gray which exhibits a moderate emittance or reflectance for all wavelengths of light. Colors that are opposite one another are called complimentaries (e.g., yellow and blue, red and blue green, purple and green and white and black).

Two complimentary colors, when mixed together in the proper proportions, can oppose or neutralize one another to produce a colorless white or grey. Contrast effects also demonstrate the complimentaries. Such contrast effects occur in fringe areas between colors and also in afterimages, which are a physiological function of the eye.

A set of primary colors can be chosen so that any other color can be produced from additive mixtures of the primaries in the proper proportions. Three-color printing systems rely on magenta, yellow and cyan and may add black as a fourth component.

Another encoding system for representing color is the RGB system, wherein, for example, each of the three guns of a video system (red, green, and blue) are controlled directly by a signal indicating their respective intensity. HLS color may be converted to the RGB representation (see Foley & VanDam, *Fundamentals of Interactive Computer Graphics*, Addison Wesley, Reading, MA 1984 pp. 648-9.), however there are HLS color combinations which must be "clipped" to be represented in RGB. The same is true of NTSC video (also known as YIQ), which has an even more restricted range than RGB. Thus, not every real world color can be reproduced by video systems using either RGB or NTSC standards. According to Foley and VanDam, "neither the V in HSV [Hue, Saturation, Value] nor the L in HLS correspond to luminance in the YIQ model, so two different colors defined in either space can easily have the same luminance, and be indistinguishable on black and white TV or videotape." (Foley and VanDam p.618)

History of Movie Coloring

Production of realistically colored motion pictures has been an objective since the time of Edison. His process used hand-applied colored dyes to tint areas of each frame of a black and white print. This process was labor intensive, and gave artificial looking results which had the appearance of the tinted photographs of that time. The colors were "flat" because they were applied as a uniform wash over the film itself, and the gray image showed through the dyes.

The first true color motion pictures were photographed using three cameras, each with a filter attached. The three black and white films could then be projected through filters having the same colors as those used in filming, and the color image recreated. This process parallels the techniques of printing, where color "separations" (monochrome plates) are separately applied to a page in order to recreate a full color image. (Within the limitations of the film and filters, this technique faithfully reproduces the original color scene. Adjustment of the intensity of the projecting lamps may enhance this accuracy if the filter transmission coefficients are known.)

The development of multi-layer color films in the 1930's meant the end of the multi-camera color technique, and by the 1950's, most films were shot in color directly. While the color films of the early days were of acceptable quality, they often exhibited undesirable hues, and have faded and undergone extensive degradation in storage. Most of these early color films are no longer useful for commercial exhibition, due to this deterioration.

Motion Picture Color Enhancement Since 1970

Since approximately 1970, several techniques have been developed for the addition of color to monochrome images. Often, these techniques rely on video technology to augment the video signal in a defined manner, typically by adding a chrominance component signal to the pre-existing luminance signal. This technique results in an appearance not unlike that achieved by Edison: a colored area over a black and white picture. Because of their reliance on video technology, all of these systems suffer from lack of vividness of colors, and from an inability to accurately reproduce colors.

BRIEF DESCRIPTION OF THE INVENTION

The present invention comprises a system and method for color enhancing an image or a series of images such as a motion picture by digitally capturing the images, interactively defining maps (or masks) corresponding to objects or regions in the images having similar hues, and for each map, defining a color transfer function for converting image gray-scale information for each picture element to unique values of Hue, Luminance, and Saturation The gray-scale values within each map are then processed through that map's color transfer function, and the resulting colors applied to the image and stored for later retrieval and display.

BRIEF DESCRIPTION OF THE FIGURES

The file of this patent contains at lesat one drawing executed in color. Copies of this patent with color drawings will be provided by the Patent and Trademark Office upon request and payment of necessary fee.

FIG. 17 depicts the gray scale of FIG. 16, after it has been color enhanced by the method of the present invention.

DETAILED DESCRIPTION OF THE INVENTION

Operational Description

Figure 1:
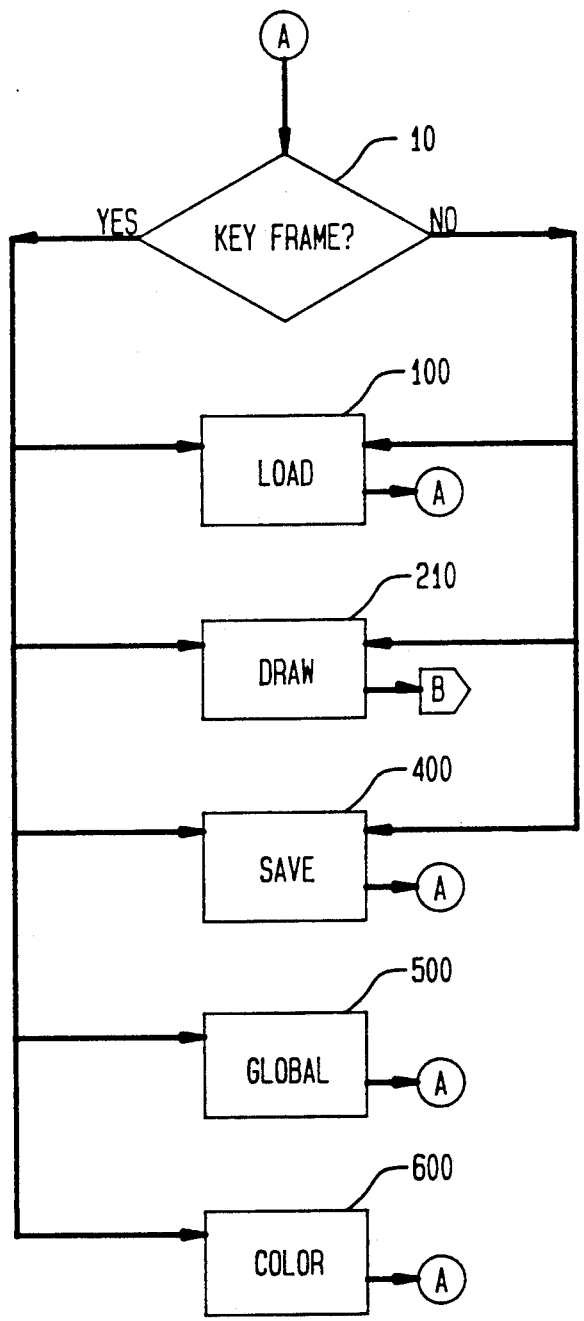
FIG. 1 depicts the Main menu structures of the software implemented method of the present invention.

The application of color to an existing, typically monochrome, film which exists in a print or prints begins with an art director who conducts extensive research into the original colors which were photographed Items such as promotional posters which were prepared in color, original costumes and props, if they are still available, and in-depth interviews with the actors and production staff involved in the original film may be used to establish accurately the colors to be rendered. Objects which remain available may be directly photographed using a color video camera and their colors converted to the internal storage format of the computer system for later retrieval and application to the film during the coloring process.

In many instances, research will yield an incomplete picture of the colors of original objects. Furthermore, in many instances, colors used in productions of black and white motion pictures were intentionally chosen for their ultimate appearance on film, and were esthetically unappealing when viewed in color. In such instances, new colors must be selected by the art director for application to the objects in the film. These color selections are used in the coloring process as described below.

General Process Overview

After completion of color research, the film to be colored or color enhanced is digitally recorded at a preselected resolution. In instances where the final product will be placed on conventional video tape, appropriate resolutions are employed (E.g. NTSC=512 lines, PAL=640, HDTV=1150-1500) Where the final product will be used for theatrical presentation, resolutions of 2000 lines or more may be employed. The digitization process comprises projecting each frame of the original typically black and white film through a liquid gate device which masks scratches and other imperfections. The projected frame is captured using a video camera such as a saticon tube and the video signal is digitized and stored in a random access memory frame buffer. The digitization process allows adjustment of the intensity of light falling on the film in order to achieve the best contrast for the particular frame being digitized. After acquisition of a frame, the digital representation of the frame is stored in nonvolatile storage for further processing. The digitization process is repeated on a frame-by-frame basis, marking each frame with a time and sequence indication (SMPTE time code).

The stored frames are collated into sequences based upon their visual content Scenes are subdivided into frames having a common camera angle, and sequences of frames are collected so as to provide the maximum degree of informational continuity between frames. A typical 100 minute motion picture may consist of from 400 to 1400 scenes or "shots" each with its own camera angle, lighting, background, costumes, and characters.

For each scene (sequence of frames), a frame is selected as being representative of the majority of the elements present in the sequence. This "key frame" is used as a template for the enhancement of other frames within the scene sequence. For this reason, the greatest care is applied to the processing of key frames. The art director or a senior colorist uses all available research information in preparing each key frame. Decisions regarding colors, intensities, light sources, contrasts, and other creative aspects of the frame are made and applied to each key frame. (See discussion above under "General Operational Description")

After key frames are enhanced and defined, they are passed with the rest of the frames comprising a scene to a work station where the regions defining the application of color are tracked from frame to frame. After each frame has been enhanced, it is restored in nonvolatile storage and sent to a central storage were all enhanced scenes are eventually reassembled according to their original sequence as a final product motion picture.

The Digitization Process

Because a new print of a motion picture is seldom available, methods of repairing prints having defects such as tears, spots, scratches, and fading must be used during the digitization step. One common method is the use of a liquid gate which encapsulates the film frames in a liquid film having a refractive index approximately equal to that of the film itself. Such a device is able to mask many scratches and similar defects without distorting the image or requiring laborious hand repair of the film itself. The liquid gate, however, is unable to compensate for such visual defects as fading or spots due to chemical breakdown and contamination.

In order to repair visual defects, image processing techniques such as spatial and time domain filtering, dithering and other forms of averaging, and contrast stretching may be employed. Such techniques are well-known in such fields as satellite image processing and biomedical technologies. By combining these film repair and enhancement techniques, a greatly enhanced monochrome digital motion picture is produced as a preliminary step to the addition of chromatic information Such enhanced "clean" prints may be useful to film historians and others concerned with the preservation of early black and white motion pictures.

Key Frame Coloring

After the re-editing process is complete and key frames have been identified within each scene, those key frames are colored by the use of a digital image processing system. The first task of the key frame colorist is to identify contiguous regions of picture elements which comprise objects of similar hue. Several software tools are available to the colorist to aid in this definition process.

The colorist interacts with the image processing system through the use of a pointing/digitizing device such as a mouse or puck. The simplist method of identifying a region which is to be assigned a hue is for the colorist to merely outline the region manually using the pointing device. A "free hand" mode allows drawing and erasing as well as control over a variably-sized cursor. The pointing device controls an interactive cursor displayed on a screen overlaying the key frame to be processed. Movement of the pointing device effects an analogous movement of the cursor and the picture elements selected by this movement are used to define an edge of a closed region. Because the cursor size may be reduced to only one pixel, the smallest region which may be produced is also one pixel.

A second drawing tool available to the colorist is one which defines polygons, rather than completely free-hand shapes. Using the pointing device, the colorist may indicate the precise placement of vertices which are intended to define the perimeter of a polygonal area of a given hue. Each vertex may be assigned or removed and, when complete, the vertices may be completed to define a closed path.

After definition of a closed perimeter by free-hand or polygon methods, the enclosed area may be assigned to the region by using one of two filling algorithms. A "region fill" assigns all picture elements within the closed shape and up to the defined edge to the region. A "cartoon fill" combines the defined edges with edge recognition algorithms in order to fill an area which is bounded by a border line such as the black pen lines which are typical of cartoons. Cartoon fill mode fills up to, or slightly over such heavy border lines and immediately allows the assignment of a color to the filled region.

After regions have been defined for all objects having a common hue, the final step is the selection and application of a given hue to that region. Colors may be selected by interactively pointing to a color wheel displayed on a video screen. After selection, the color may be displayed by its application to the regions which are collectively known as a color mask. Subtle adjustments of color are permitted, as well as color "bending" which is used in order to approximate shades of reflected light and the effects of specular highlights. After a color mask has been defined, additional masks are defined in a similar manner, one for each hue which will be displayed in the frame.

Once all color masks are defined, the masks, the underlying frame, and the colors assigned to each mask are stored for later retrieval by colorists who will reiterate the process using the subsequent frames of each scene and the key frame which has been defined.

Threshold Region Definition

When dealing with many small colored shapes against a contrasting background, it is laborious to define by hand each colored shape. Therefore, the use of contrast recognition algorithms, coupled with a variably sized "brush" (a form of cursor) permits the automatic definition of regions to be colored. The brush "tip+ may be set to different dimensions. One such setting may be a square matrix of a fixed dimension. By selecting a brush size which is large enough to guarantee encompassing at least one edge in any location, and selecting a gray scale threshold value, the colorist may include or exclude those picture elements having a gray scale value above or below the threshold. In this way, the leaves of a tree silhouetted against the sky may be defined as regions merely by "painting" over them and including those picture elements which are darker than the threshold value within the region to be defined.

Production Coloring

The process of extrapolating color enhancement from key frames to entire scenes is performed by production colorists whose primary purpose is to identify and track motion as well as appearances and disappearances of objects. Generally fewer than 5% of the picture elements in a frame of a scene change in the succeeding frame. Because motion pictures are filmed at 24 frames per second, increments of motion on all but the most rapidly moving objects are extremely small and easily followed. Once motion has been identified, movement or reshaping of the mask regions and application of the art directors predefined colors to those regions is all that is required.

Frame to Frame Tracking

The simplest form of tracking from frame to frame is where motion in the frame is apparent only, as a result of a camera pan. In such instances, the entire mask structure overlying the frame may be copied from the preceding frame and shifted in the direction of the pan. Such a shift will create an undefined region at the end opposite the motion. This region must then be masked and added to the existing masks in order to completely apply color.

When only some of the objects of a frame translate, a corresponding portion of the mask may be translated as well. In this operation, called "slide blob", that portion of the mask which is to be moved is designated by the operator and is moved manually to its new location. The old location must then defined and added to a pre-existing mask in order to apply color.

Implicit in all frame-to-frame tracking is the ability to copy predefined masks which originate with a key frame and to use those masks in subsequent frame processing. After copying, small adjustments may be made to the new mask structure and it may be saved with the frame to which it pertains. Importantly, because the digitization process assures consistency of brightness and gray scale, and because colors are predefined by the art director, overall consistency from frame-to-frame, and scene-to-scene is also assured.

In highly complex scenes, where several types of motion are present, (especially compound motion of subject and camera) a differencing procedure is employed. A frame which has been defined and to which color has been applied is subtracted from a next subsequent frame in order to reveal those picture elements which have changed. These areas of difference are then displayed as a contrasting overlay on the subsequent frame to be processed. By examining the coincidence of this overlay and the mask structure which has been duplicated from the preceding frame, the production colorist is able to quickly designate areas which should be added to the mask structure, and those which must be removed from the mask and reassigned.

In practice, the different picture elements are made to appear to "sparkle" in order to draw the colorist's attention. Upon recognizing a different area, the colorist need only determine which direction the object appeared to move in the frame, designating those highlighted picture elements sparkling toward that side of the object has to be newly included in the objects mask and those indicating the area from which the object moved has to be added to the background mask.

The final operation undertaken by the production colorist is to assure that no objects have either completely appeared or disappeared from the frame. If an object disappears, its mask must be removed. Similarly, newly appearing objects must have a mask defined for them "on the fly" and a color assigned as well. After adjusting the mask for the next subsequent image, the colorist again stores that image together with its mask and repeats the process for each subsequent frame.

Hardware Overview

The method of the present invention is implemented on a special purpose implementation of an RTI-Station image processing system interfaced to a personal computer (such as the IBM"personal computer AT). The RTI image processing subsystem (available from Recognition Technology, Inc. of Holliston, MA) comprises a video digitizer, a pipeline architecture pixel processor, and image memory which is all interconnected both by a host computer bus and by a synchronous video bus. The video digitizer takes its input from a video camera such as that described above for digitizing film frames, and outputs its information to a high definition color monitor. The host computer bus permits the image processing subsystem to communicate with the user through the host CPU, its memory, associated mass storage devices, and I/O devices including pointing devices and keyboards.

The image processing subsystem of the preferred embodiment of the present invention comprises an image memory having 512×512 spatial resolution, 8 bits of brightness resolution, and 3 bits for map identification. Alternatively, the same system may be configured for 6 bits of brightness resolution and 5 bits of map identification or for 7 bits of brightness resolution and 4 bits of map identification. (One additional bit is reserved for scratchpad use by the system.) General information regarding the structure and operation of the RTI Station and its associated software library (RTILIB) may be found in the RTILIB/500 Tutorial Revision 1.00 and the RTILIB/500 User Manual Revision A, which are published by Recognition Technology, Inc. Although current implementations employ a 512 line spatial resolution, it will be recognized by those skilled in the art that increases to and above 2000 line spatial resolution are within the scope of the present invention.

For the purpose of color selection, the host CPU is provided with a 24 bit RGB video board. A color wheel which corresponds to the base of the HLS cone is displayed on a video screen. Using a pointing device, the colorist selects a particular color on the wheel, thus defining both hue (angular position on the color wheel) and saturation (distance from the center). As described more fully below, this unique 24 bit RGB value is translated immediately into the HLS coordinate space, mapped to the image gray-scale, and retranslated for output on an RGB monitor.

Software Overview

The software implementation of the present invention is presented to colorists through a series of menus which appear and are selected as superimposed textual information on the high resolution video screen. The ability to assign colors to individual maps and the ability to globally edit entire sequences are available only to key frame colorists. Options available to all system users include loading a frame from non-volatile storage to random access memory, saving a frame from random access memory to non-volatile storage, and drawing options which control the definition of regions and maps and the identification of a particular region or map with a color.

Referring now to FIG. 1 there is shown a structural diagram of the menus of the software system of the present invention. The actions selected by each menu option which are further described with reference to FIGS. 2-14 (below) are:

| KEYFRAME | SUBFRAME |
|---|---|
| LOAD | LOAD |
| SAVE | SAVE |
| DRAW | DRAW |
| GLOBAL | |
| COLOR | |

Figure 2:
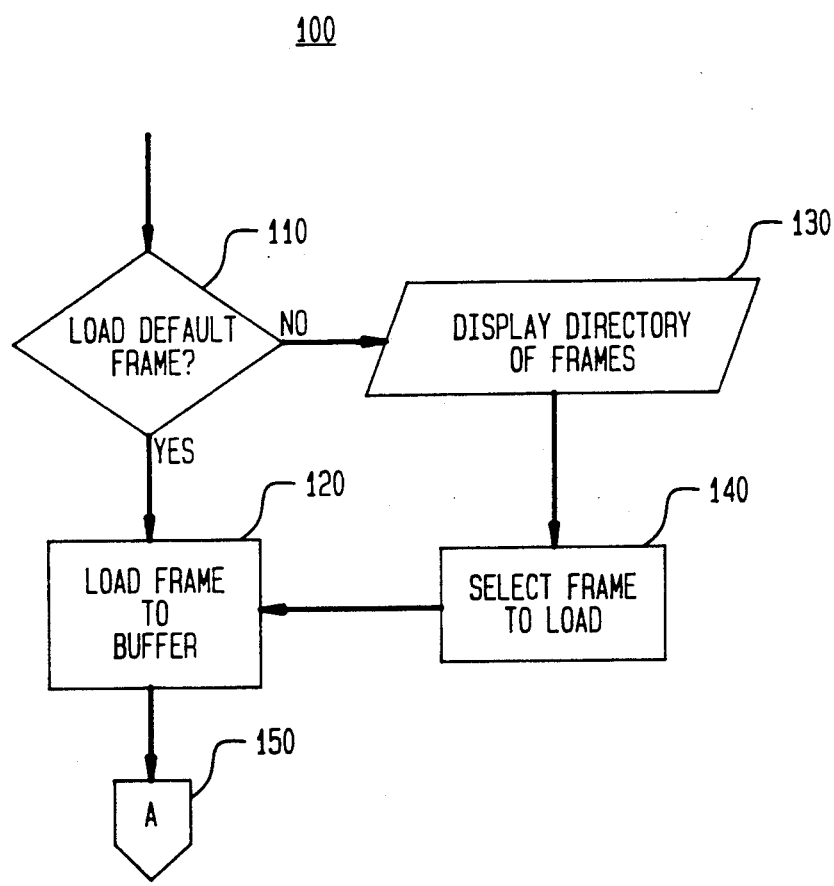
FIG. 2 depicts a flow diagram of the Frame Load method of the present invention.

Referring now to FIG. 2 there is shown a flow diagram of the frame load process 100. Because the software maintains a directory of frames, a default frame may be indicated and incremented during normal processing. Upon selection of the load frame to buffer menu option, the user is presented with a choice of whether to load the default next frame. Decision 110 determines whether the user indicates that the default frame should be loaded. If the user does not wish the default frame to be loaded, I/O operation 130 fetches and displays a directory of frames which are available for loading. At operation 140, the user selects a particular frame from this directory. The frame which has been identified, either as the default, or by user selection, is loaded from non-volatile storage to random access memory at operation 120. Processing then returns to the main menu via off-page connector 150.

Figure 3:
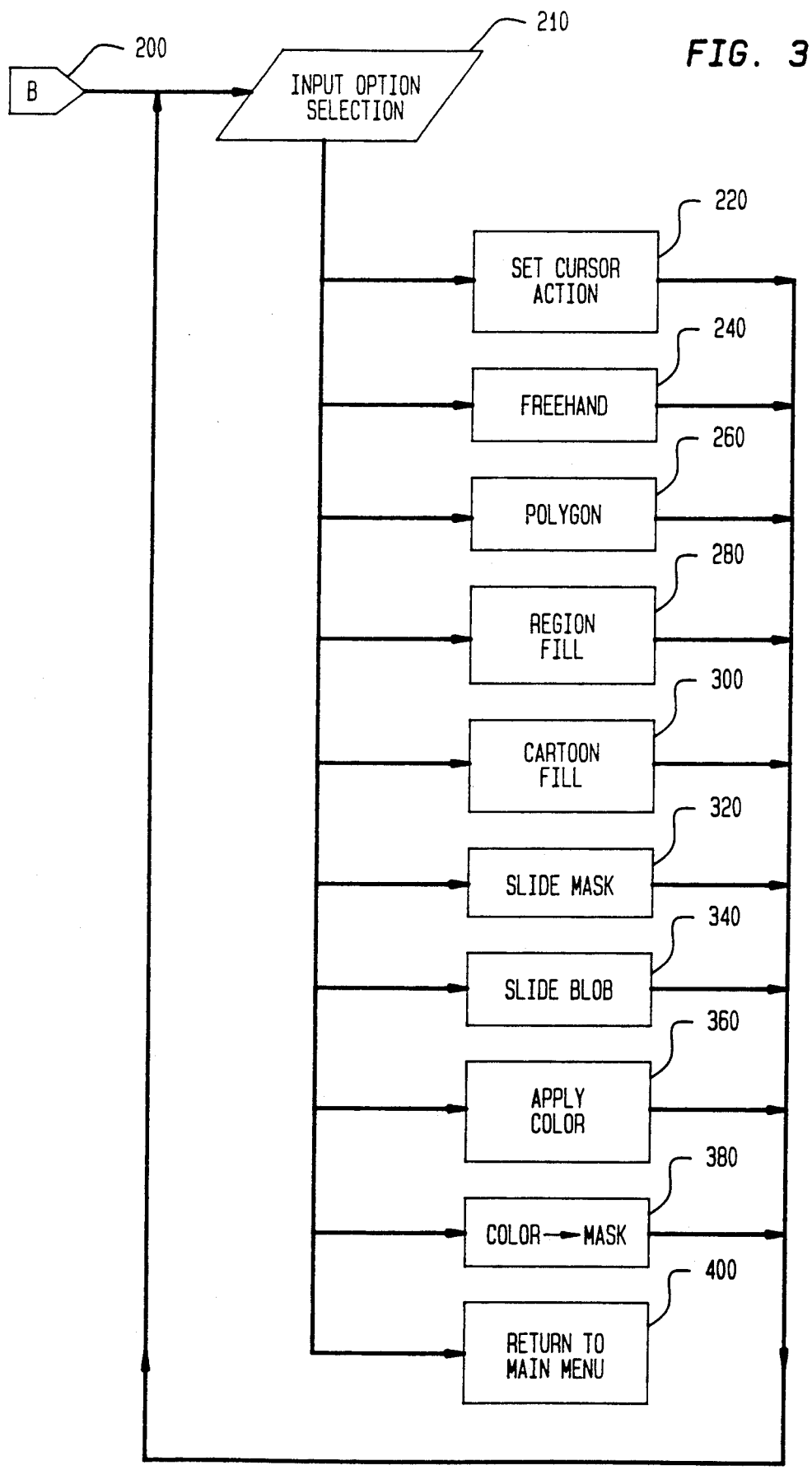
FIG. 3 depicts a flow diagram of the Draw Submenu of the present invention.

Referring now to FIG. 3, there is shown a flow diagram representation of the menu selection process of the Draw Menu. The Main Menu enters the processing flow at on-page connector 200. I/O operation 210 allows user selection of any of 10 drawing options, or a return to the Main Menu via off-page connector 400. Selection of any of the drawing options causes a branch to that particular option. The available options are: set cursor action 220, free-hand drawing 240, polygon drawing 260, region fill 280, cartoon fill 300, slide mask 320, slide blob 340, apply color 360, and color to mask 380 After exiting the particular drawing mode, each routine returns via its respective off-page returns to the I/O operation 210 in order to allow for an additional selection to be made.

Figure 4:
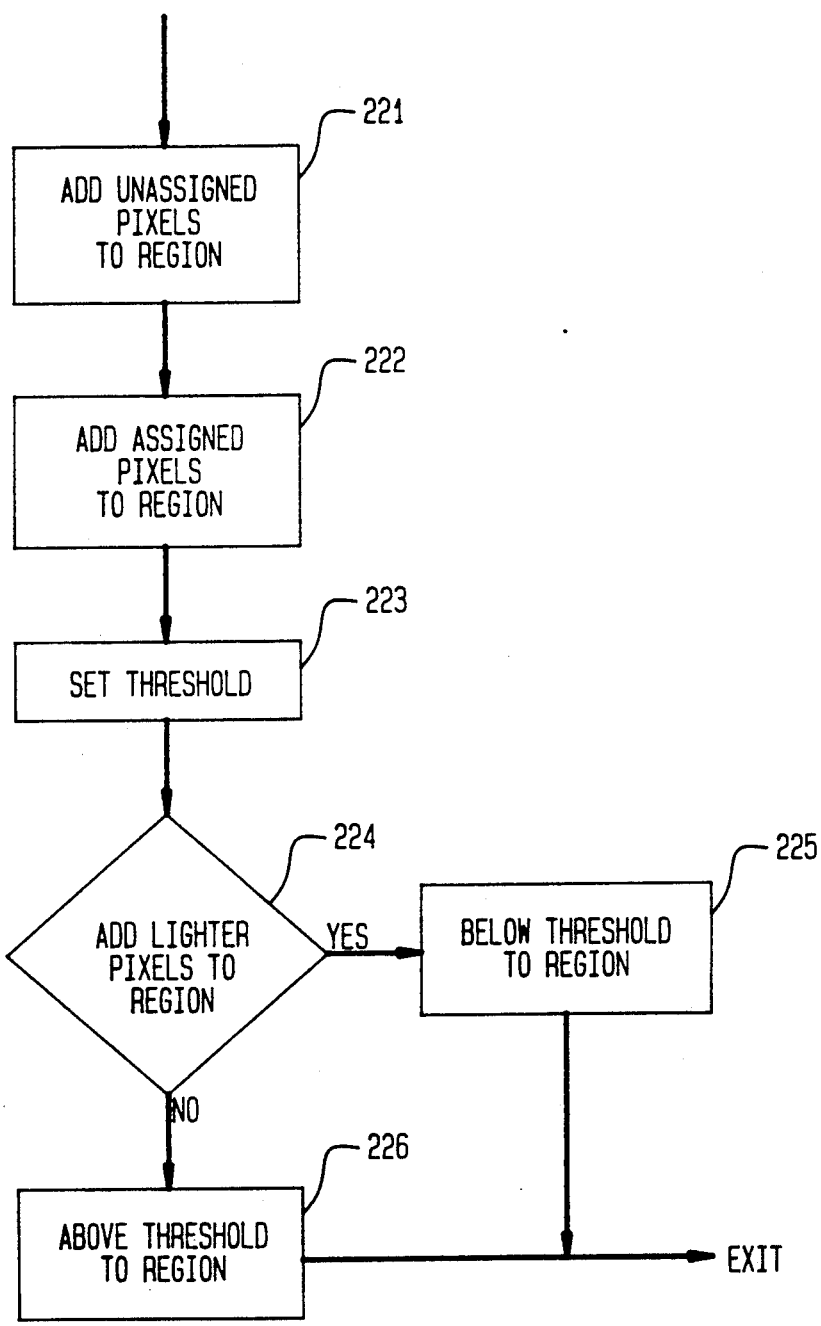
FIG. 4 depicts a flow diagram of the Set Cursor Action method of the present invention.

Referring now to FIG. 4, there is shown a flow diagram representation of set cursor action routine 220. The video cursor may operate in one of three modes upon the picture elements over which it passes while it is active. The first mode is the addition of uncolored (unassigned) pixels to the region being defined. Block 221 indicates the setting of this mode. Block 222 indicates the activation of the converse mode: the addition of colored (assigned) pixels to the current region. Block 223 indicates the setting of the third available mode: threshold. The definition of a brightness threshold at operation 223 is followed by decision 224 which ascertains whether those pixels lighter than the threshold setting are to be added to the current map under definition. If so, operation 225 sets the appropriate mode to assign pixels below threshold to the map. Otherwise, operation 226 assures that those pixels above the defined threshold become part of a new region.

Figure 5:
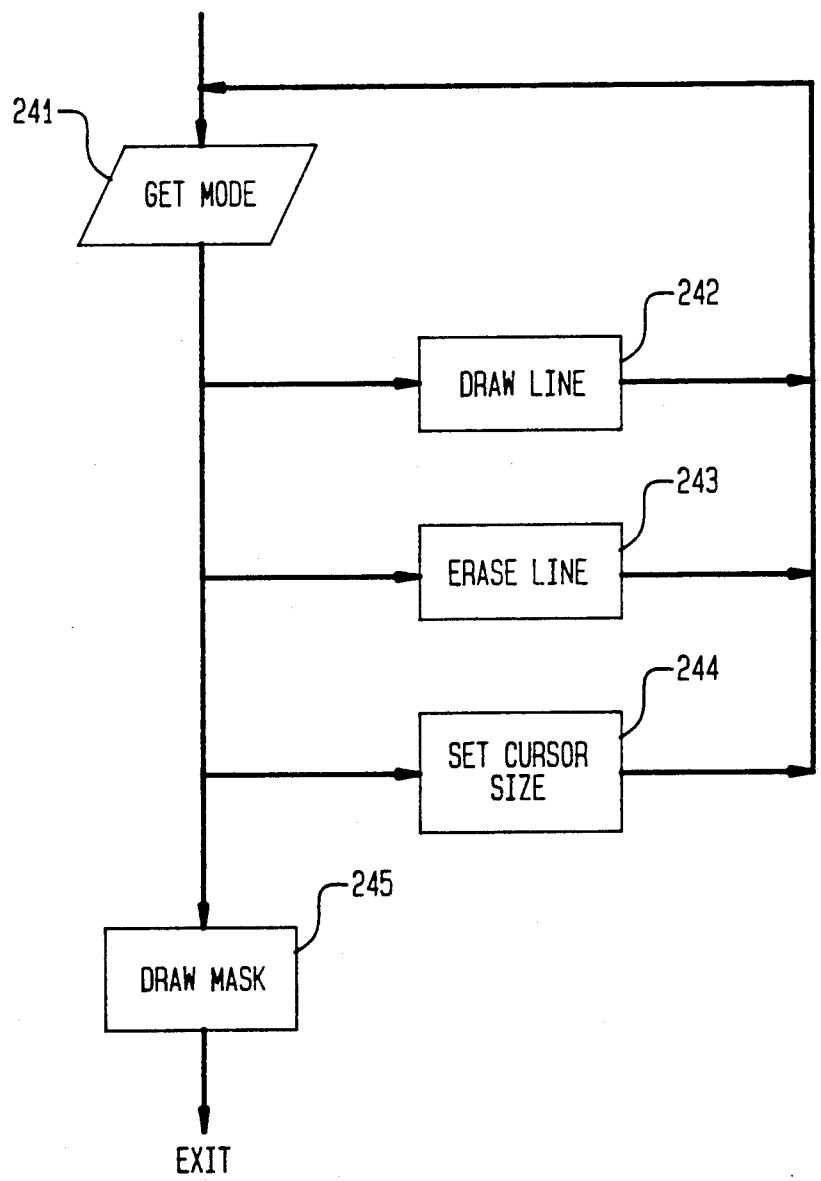
FIG. 5 depicts a flow diagram of the Freehand Draw method of the present invention.

Referring now to FIG. 5, there is shown a flow diagram of the free-hand drawing mode operation 240. The user is presented with a menu and I/0 operation 241 allows entry of a selection from that menu. Available selections include the line drawing operation 242, the line erase operation 243, and the setting of the size of the drawing cursor 244. Each of these modes returns to I/O operation 241 for an additional selection or for mode exit after creation of the mask from the drawn lines by selecting 245.

Figure 6:
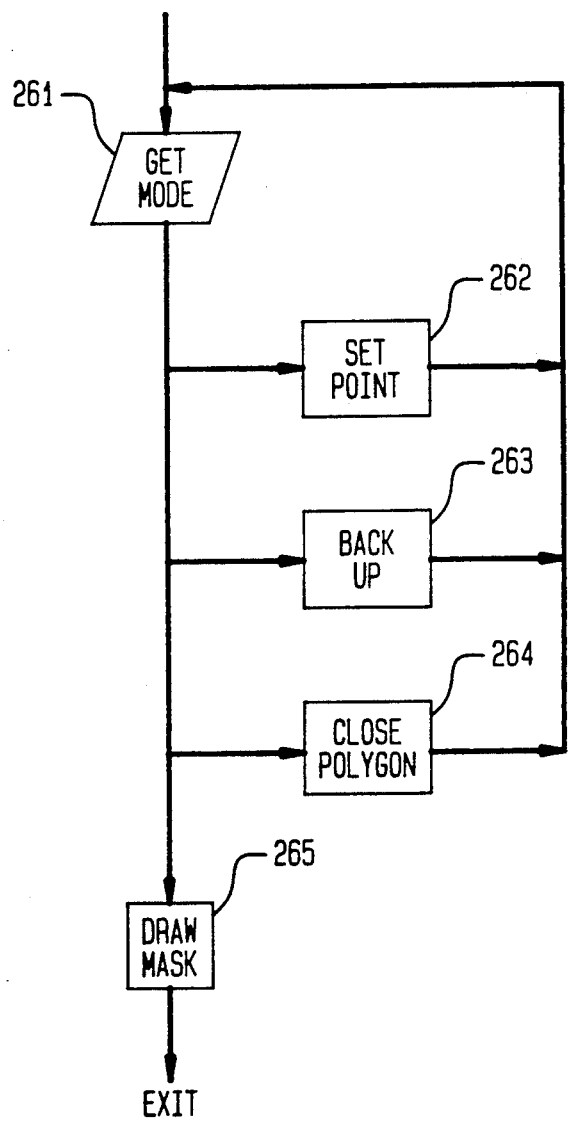
FIG. 6 depicts a flow diagram of the Polygon Draw method of the present invention.

Referring now to FIG. 6, which depicts a flow diagram representation of the polygon drawing operation 260, there is shown I/0 operation 261 which permits user selection of the operation mode. Modes available include setting a polygon point (vertex) at operation 262, the removal of a previously set point (vertex) at operation 263, and the closing of the polygon by the construction of a straight line at operation 264. These modal operations return to I/0 operation 261 for an additional selection or for exit by way of mask drawing operation 265 which converts the picture element locations identified as falling within the polygon to the internal mask identification codes of the image processing computer.

Figure 7:
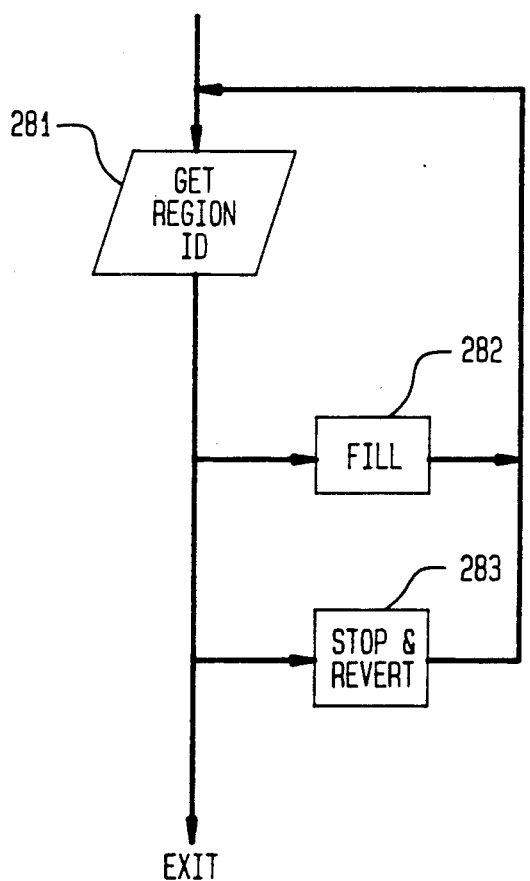
FIG. 7 depicts a flow diagram of the Region Fill method of the present invention.

Referring now to FIG. 7, there is shown a flow diagram of the region fill operation 280. At IO operation 281 the user selects an unfilled region which is to be filled. The unfilled areas of the region are filled in operation 282. During this fill operation, the user may abort the operation by providing input at IO operation 281 to select the stop operation 283 which will cause the region to revert to its unfilled state. After the region fills are completed, the routine exits.

Figure 8:
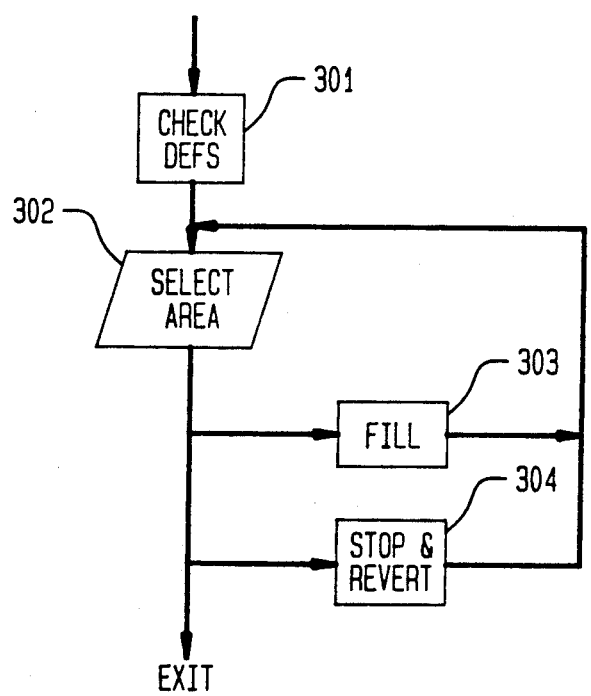
FIG. 8 depicts a flow diagram of the Cartoon Fill method of the present invention.

Referring now to FIG. 8, there is shown a flow diagram representation of the cartoon fill mode 300. Operation 301 checks the regions definitions including the setting for edge recognition such as line width and overfill distance At I/0 operation 302 the user selects the area of frame to be filled and the option required Operation 303 fills the region through an edge recognition process and operation 304 allows the user to abort the fill operation and causes the partially filled region to revert to its initial unfilled state Known edge recognition processes may be employed to define and follow the gray-scale boundaries within the image For example, a threshold look-up table may be employed to identify edges, either with or without the use of a contrast-stretching transformation of the gray-scale information. Alternatively, other common edge recognition techniques such as difference matrix conversion to obtain the first derivative of the image, gradient edge detection, or Laplacian transform analysis may be employed. (see Kerlow et. al., *Computer Graphics for Designers and Artists*, Van Nostrand Reinhold Co., New York, 1986, pp. 150–3)

Figure 9:
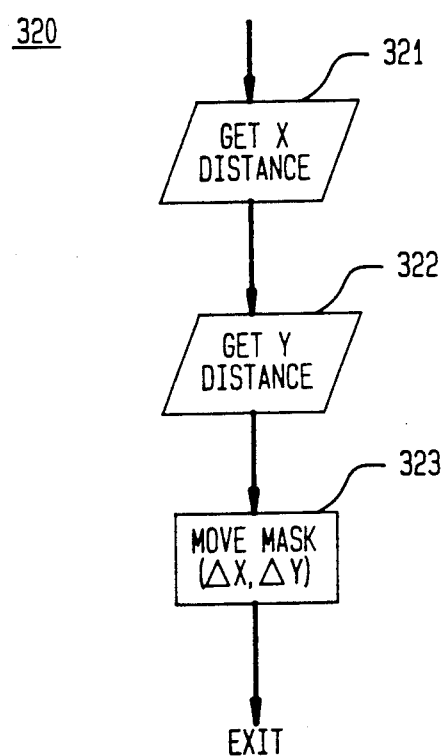
FIG. 9 depicts a flow diagram of the Slide Mask method of the present invention.

Referring now to FIG. 9, there is shown a flow diagram of the mask slide operation 320. Using the pointing device, the user inputs the horizontal or X distance to be traversed at I/0 operation 321 and the vertical or Y distance to be traversed in I/O operation 322. The entire mask structure is then moved the indicated distance at move operation 323 and the routine exits.

Figure 10:
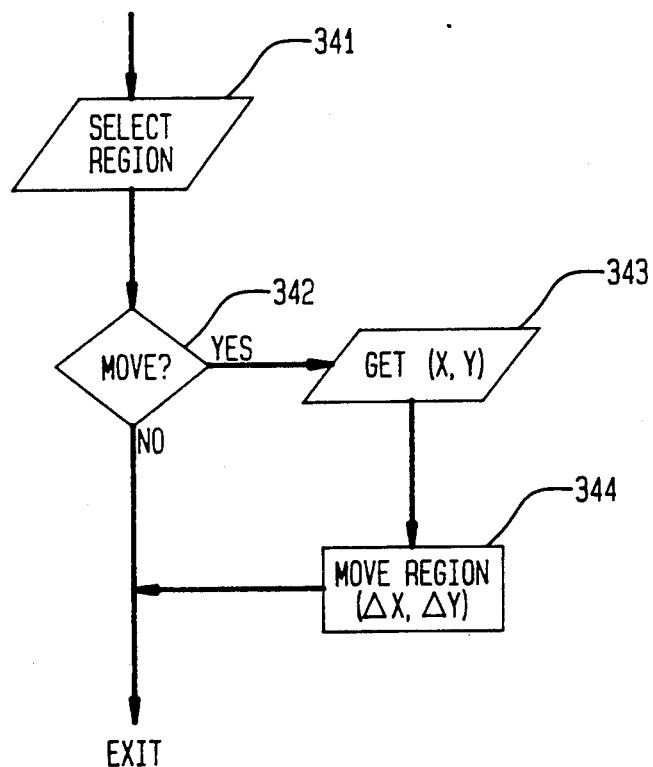
FIG. 10 depicts a flow diagram of the Slide Blob method of the present invention.

Referring now to FIG. 10, there is shown a flow diagram representation of the slide blob routine 340. At I/O operation 341 the user selects the region or regions to be translated. At decision 342 the user may choose to move the selected regions or to exit. If the user chooses to move the regions, the pointing device is used as input to I/O operation 343 in order to indicate the horizontal and vertical distances to be moved. Move operation 344 translates the regions and the routine exits.

Figure 11:
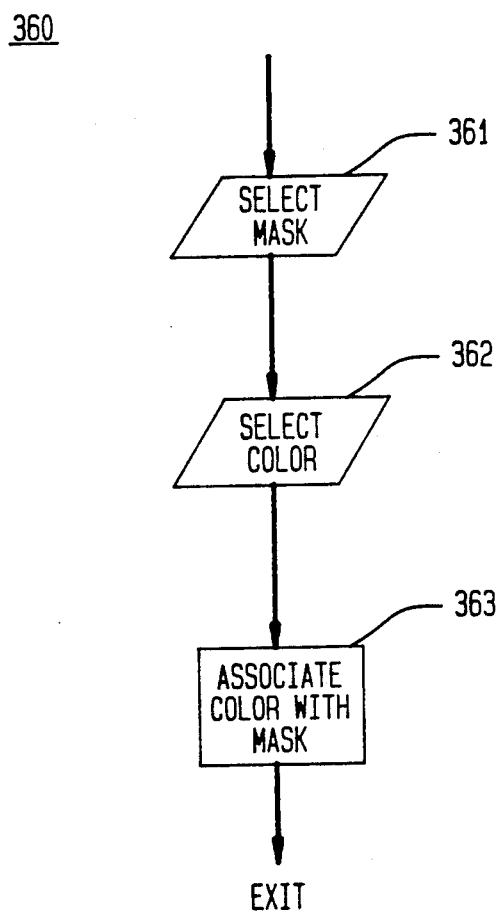
FIG. 11 depicts a flow diagram of the Apply Color method of the present invention.

Referring now to FIG. 11, there is shown a flow diagram representation of apply color routine 360 at I/O operation 361 the user selects one of the masks present in the frame as being active. At I/O operation 362 the user selects the color which will be assigned to that mask from the palate of available colors, either the color wheel in key frame mode, or the color bar in sub-frame mode. At operation 363 the selected color is applied to the active mask and the routine exits.

Figure 12:
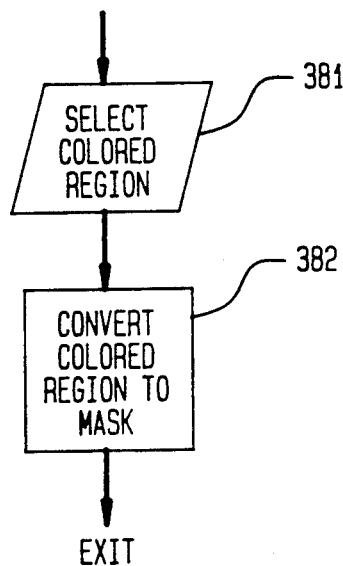
FIG. 12 depicts a flow diagram of the Convert Color to Mask method of the present invention.

Referring now to FIG. 12, there is shown a flow diagram representation of the color to mask routine 380. I/O operation 381 allows the user to select one or more regions having a common color. Operation 382 converts these color regions to a mask which may then be stored along with the frame or transferred to subsequent frames The routine exits after mask creation.

Figure 13:
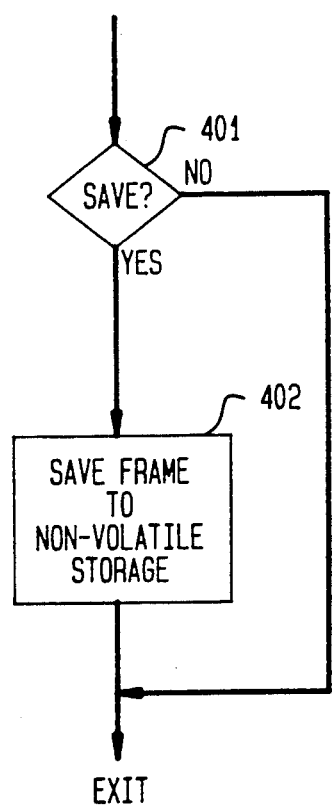
FIG. 13 depicts a flow diagram of the Save Frame method of the present invention.

Referring now to FIG. 13, there is shown a flow diagram of the frames save routine 400 at decision 401, the user is asked whether the frame is to be saved to non-volatile storage under its current name. If so, the save operation 402 is executed and the routine exits if the frame is not to be saved the routine exits.

Figure 14:
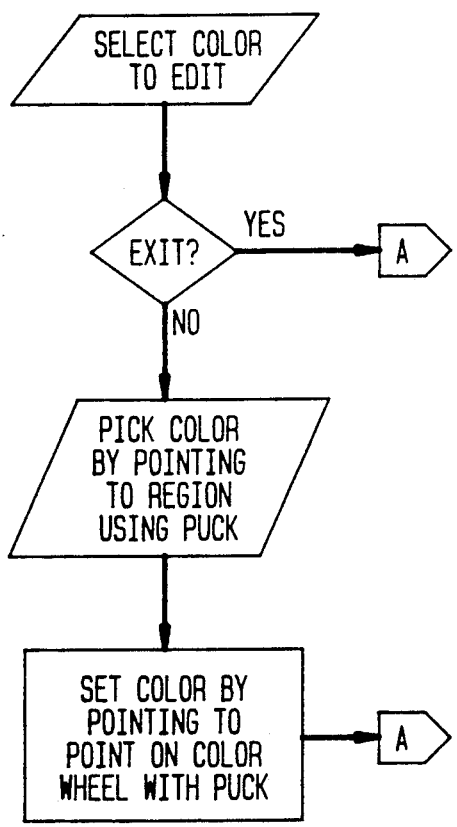
FIG. 14 depicts a flow diagram of the Edit Color method of the present invention.

Referring now to FIG. 14, is shown a flow diagram representation of the edit color process 600. Two additional operations are available to key frame colorists. These operations are the global edit operation 500 and the color edit operation 600. The global edit operation allows the editing or re-editing of any frame at any time by a key frame colorist. This editing includes the ability to designate any frame as a key frame The operation is merely a selection of a frame, either by its time code or by selection from a displayed directory Thereafter, the particular frame selected is available for editing using full range of routines Color edit routine 600 allows the key frame colorist to alter the parameters which define any color applied anywhere in an enhanced motion picture By selecting a given color, which has previously been applied within a mask, and by altering that color using the color wheel, the new color will automatically be applied in place of the original.

The Application of Color to a Monochrome Image

According to the method of the present invention, a digitized monochrome image may be stored in a random access memory of a computer as an array of gray-scale values. For example, 8 bits of information may be used to represent each picture element, thus permitting a total of 256 unique gray-scale values to be represented. The digitization step may optionally include the use of look-up tables in order to enhance contrast, enhance edge definition or "stretch" the gray-scale of a faded image.

After a map has been defined according to the processes described above, a color must be chosen and applied to that map in order to produce the final colored motion picture frame. Color selection, as described above, is done using an interactive graphical color wheel. This color wheel represents the horizontal slice of the vertically oriented double-conic HLS space at L=0.5 (namely, the base of the two cones).

Figure 15:
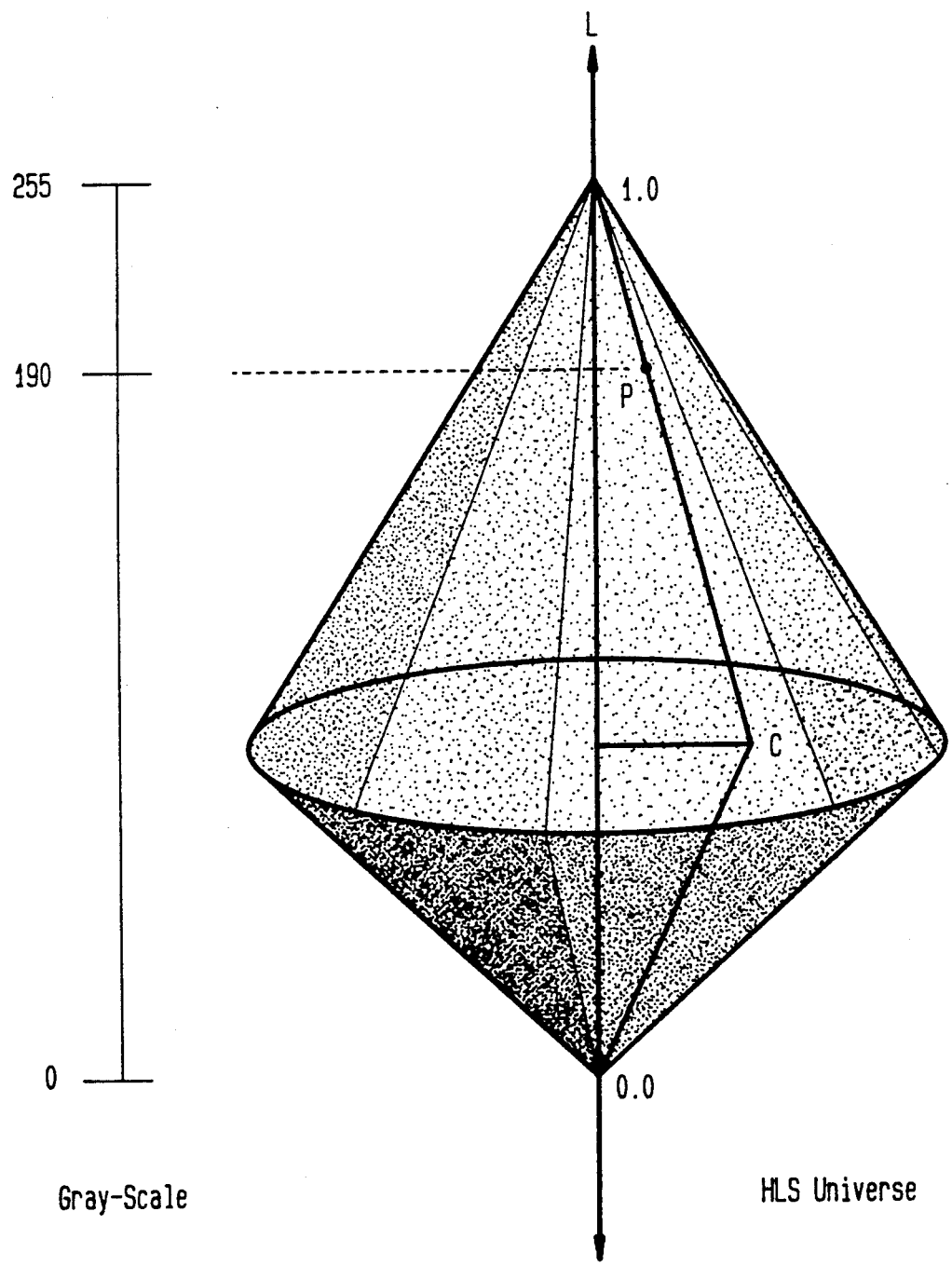
FIG. 15 depicts a perspective semitransparent transparent view of the HLS color model and linear gray scale used in the method of the present invention.

Referring now to FIG. 15, there is shown a perspective representation of the HLS color space. For a given map, the -point identified as C represents the color identified by the human colorist as that desired for application to the objects represented by regions comprising the color masks. The color of the point C is determined by the angular position on the wheel (hue) and its distance from the center of the wheel (saturation).

Because regions are defined so as to include all objects of a similar hue, regions and the maps they comprise contain a wide range of picture element gray-scale values. In order to accurately represent the gray-scale values in the final colored image, a color transfer function must be defined for converting the one-dimensional gray-scale to a set of three dimensional HLS values. From the point C, a line segment is extended downward to the zero luminance point, and a second line segment is extended upward to the 1.0 luminance point. Taken together, these two line segments pass through the points in HLS space which represent the colors to be applied within the map, and comprises the color transfer function. For example, an 8 bit picture element having a gray-scale value of 190 is represented on the gray-scale of FIG. 15. The corresponding point P on the upper segment of the color transfer function defines a unique HLS value which will be applied to those picture elements within the region having the 190 gray-scale value. It will be recognized that because the color transfer function traverses the entire altitude of the HLS coordinate space, points which are either very dark or very light in gray-scale are correspondingly less saturated when displayed in color. This renders the displayed colors much more realistic than systems using constant saturations such as RGB or YIQ based systems.

Specular highlights are those areas of particularly bright reflection due to angle of incidence effects. The production of colorless specular highlights can be thought of as shortening of the altitude of the upper cone of the HLS space. For picture elements having gray-scale values which are above a particular brightness, the reduction in saturation will produce the appearance of a specular highlight. Alternatively, the production of specular highlights may be thought of as the application of a non-linear look-up table to the gray-scale values so as to provide a linear assignment of gray-scales from 0 to the midpoint and a non-linear assignment from the midpoint to the brightest value to shift the medium-bright values upward toward the tip of the HLS cone.

Finally, reflection of colored light sources may be simulated by adjusting the shape of the upper HLS cone. By placing the peak of the cone off of the luminance axis, a hue component as well as a saturation may be introduced to the luminance value extreme at the top of the double-cone HLS coordinate system. The upper line segment of the color transfer function is still constructed to the peak of the HLS conic space. However, the upper conic space would be asymetric and points of higher brightness would begin to assume not only higher luminance and altered saturation, but altered hue as well. By this technique, the reflected yellow of a fire light or red of a neon sign may be accurately reproduced without the necessity of defining separate regions having diffuse boundary areas.

It will be appreciated by those skilled in the art that one may hold one of the HLS parameters constant, in order to more easily vary the other two. For instance, one may choose a hue representative of the average color of an object, and simultaneously vary the luminance and saturation of the picture elements in order to achieve a natural-looking color. Alternatively, one may choose an average luminance for a given object, and simultaneously vary the hue and saturation while maintaining that luminance constant

EXAMPLE

Figure 16A:
FIG. 16A depicts a photographer's gray scale.

FIG. 16A is a photographer's gray-scale quality control device (Copyright Eastman-Kodak Company, 1977). According to its manufacturer, this gray-scale device helps a photographer (1) compare tone values of reflection copy with its reproduction, (2) find the correct exposure and processing conditions, (3) balance negatives and positives in a color reproduction process, and (4) plot tone reproduction curves. Kodak describes the gray-scale quality control device as follows: The gray-scale has 20 steps in 0.10 density increments between a nominal "white" of 0.0 density and a practical printing "black" of 1.90 density.

Figure 16B:
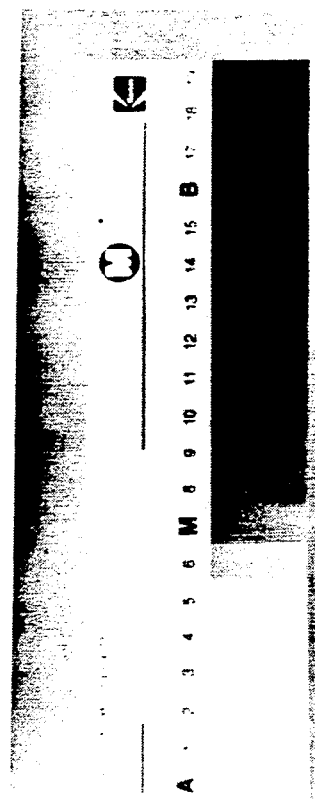
FIG. 16B depicts a reproduction of the gray-scale of FIG. 16A after digitization.

For the purposes of the present example, the gray-scale of FIG. 16A is digitized according to the process described above to yield the gray-scale of FIG. 16B.

The gray-scale is then reproduced three times (each comprising one rectangular region), identified as I, II, and III, each of which encompasses the full range of gray-scale values. As depicted in FIG. 17, the scale identified as I is colored with a magenta hue, II with a yellow hue and III with a cyan hue. The HLS values which result from application of the gray-scale values within the individual maps to the color transfer functions produce the colors as shown. It must be noted that FIG. 17 was produced on a video printing device which employs dyes to transfer color to paper. Because of the inherent limitations of the video camera employed in the digitization process, and of the video printing process, the color rendition of FIG. 17 is less vivid, and the gray-scale range more restricted than would actually be shown on a video screen.

GLOSSARY OF TERMS

Image—monochrome or color analog picture
Picture Elements—discrete locations in an image
Brightness—the absolute amount of light transmitted through a monochrome image (dependent on incident light intensity)
Capturing an Image Digitally—recording digital data representative of an image and from which an image can be re-created.
Gray-Scale Value—relative amount of light transmitted through a point on a monochrome image (dependent on incident light intensity)
Luminance—the absolute amount of light emitted by, or transmitted through a point on a color image
Hue—the peak wavelength emitted by or transmitted through a point on a color image
Saturation—the relative number of colored to uncolored points in a given area of a color image (more colored = higher saturation)
Region—a continuous group of picture elements having a common property (brightness, luminance, hue, saturation)
Map (or Mask)—a collection of one or more regions of an image having a range of common properties (brightness, luminance, hue, saturation), such as a similar hue; each such region comprising contiguous picture elements representative of one or more objects or image areas having the common property
Specular Highlight—region of high brightness (monochrome) or high luminance (color) brought about by direct (angle or incidence) reflection of a light source.

I claim:

1. In a method for selectively coloring at least one picture element of an image comprised of a multiplicity of picture elements by combining image information from mask-defined regions of the image with color information, the improvement consisting of defining a mask-defined region:
   a) selecting a threshold gray-scale value so that picture elements having a gray scale value above said threshold gray-scale value will be within said mask-defined region;
   b) analyzing each picture element within a predetermined area to determine it if is above said threshold gray-scale value; and
   c) assigning each picture element from said predetermined area having a gray-scale value above said threshold gray-scale value to said mask-defined region.

2. In a method for selectively coloring at least one picture element of an image comprised of a multiplicity of picture elements by combining image information from mask-defined regions of the image with color information, the improvement consisting of defining a mask-defined region by:
   a) selecting a threshold gray-scale value so that picture elements having a gray scale value below said threshold gray-scale value will be within said mask-defined region;
   b) analyzing each picture element within a predetermined area to determine if it is below said threshold gray-scale value; and
   c) assigning each picture element from said predetermined area having a gray-scale value below said threshold gray-scale value to said mask-defined region;

3. The method of claim 1 wherein the predetermined area is step (b) is a square matrix.

4. The method of claim 2 wherein the predetermined area of step (b) is a square matrix.

5. In a method for selectively coloring at least one picture element of an image comprised of a multiplicity of picture elements by combining image information from mask-defined regions of the image with color information, the improvement consisting of:
   (a) assigning to an image to be colored, mask-defining region information and color information from a previous image; and
   (b) moving at least one of said mask-defined regions a predetermined distance along a predetermined axis to a moved location and storing mask-defining region information for said image to be colored at the moved location.

6. The method of claim 5 wherein said at least one of said mask-defined regions consists of all mask-defined regions in said previous image.

7. The method of claim 5 including the further step of assigning those pixels which are within a mask-defined region of the previous image and are not within a corresponding moved mask-defined region to an additional mask-defined region.

* * * * *